United States Patent
Yu et al.

(10) Patent No.: US 11,792,888 B2
(45) Date of Patent: Oct. 17, 2023

(54) METHODS TO SIGNAL ANTENNA PANEL CAPABILITY OF USER EQUIPMENT (UE) FOR CARRIER AGGREGATION (CA) IN MILLIMETER-WAVE (MMWAVE) FREQUENCY BANDS

(71) Applicant: Apple Inc., Cupertino, CA (US)

(72) Inventors: Zhibin Yu, Unterhaching (DE);
Michael A. Ruder, Pommelsbrunn (DE); Jie Cui, Santa Clara, CA (US);
Yang Tang, Pleasanton, CA (US)

(73) Assignee: Apple Inc., Cupertino, CA (US)

(*) Notice: Subject to any disclaimer, the term of this patent is extended or adjusted under 35 U.S.C. 154(b) by 233 days.

(21) Appl. No.: 17/111,730

(22) Filed: Dec. 4, 2020

(65) Prior Publication Data
US 2021/0204361 A1    Jul. 1, 2021

Related U.S. Application Data

(63) Continuation of application No. 16/276,824, filed on Feb. 15, 2019, now Pat. No. 10,863,582.
(Continued)

(51) Int. Cl.
| | |
|---|---|
| H04W 88/06 | (2009.01) |
| H04W 8/22 | (2009.01) |
| H04L 5/00 | (2006.01) |
| H04W 72/0453 | (2023.01) |
| H04W 76/27 | (2018.01) |

(Continued)

(52) U.S. Cl.
CPC .......... *H04W 88/06* (2013.01); *H04B 7/00* (2013.01); *H04L 5/001* (2013.01); *H04L 5/0048* (2013.01); *H04L 5/0053* (2013.01); *H04L 5/0094* (2013.01); *H04W 8/22* (2013.01); *H04W 8/24* (2013.01); *H04W 72/0453* (2013.01); *H04W 76/27* (2018.02); *H04W 24/00* (2013.01); *H04W 72/046* (2013.01)

(58) Field of Classification Search
CPC ... H04W 88/06; H04W 8/22; H04W 72/0453; H04L 5/001
See application file for complete search history.

(56) References Cited

U.S. PATENT DOCUMENTS

| | | | |
|---|---|---|---|
| 10,141,894 B1 * | 11/2018 | Aruppukottai Boominathan ........ H03F 1/3211 |
| 2012/0190395 A1 | 7/2012 | Pan et al. | |

(Continued)

FOREIGN PATENT DOCUMENTS

| | | | | |
|---|---|---|---|---|
| WO | WO-2018072699 A1 * | 4/2018 | ............ | H04W 16/28 |

*Primary Examiner* — Zhiren Qin
(74) *Attorney, Agent, or Firm* — Kowert, Hood, Munyon, Rankin & Goetzel, P.C.

(57) ABSTRACT

Embodiments of a User Equipment (UE), Next Generation Node-B (gNB) and methods of communication are generally described herein. The UE may be configured for carrier aggregation (CA) in which a plurality of component carriers (CCs) are aggregated. The UE may determine a mapping of the CCs to a plurality of antenna panels for downlink reception, wherein a subset of the CCs are mapped to each antenna panel. The UE may transmit, to the gNB, radio resource control (RRC) signaling that indicates information related to the mapping. The gNB may, based at least partly on the mapping, determine, for each CC: a first scheduled time period for transmit beam refinement, and a second scheduled time period for receive beam refinement at the UE.

20 Claims, 14 Drawing Sheets

Related U.S. Application Data

(60) Provisional application No. 62/710,320, filed on Feb. 16, 2018.

(51) Int. Cl.
  *H04W 8/24* (2009.01)
  *H04B 7/00* (2006.01)
  *H04W 72/044* (2023.01)
  *H04W 24/00* (2009.01)

(56) References Cited

U.S. PATENT DOCUMENTS

| | | |
|---|---|---|
| 2014/0307646 A1 | 10/2014 | Chen et al. |
| 2016/0337916 A1* | 11/2016 | Deenoo ............. H04W 36/0094 |
| 2017/0179985 A1* | 6/2017 | Kim .......................... H04B 1/10 |
| 2018/0219605 A1 | 8/2018 | Davydov et al. |
| 2018/0255607 A1* | 9/2018 | Nagaraja ............... H04L 5/0053 |
| 2019/0182682 A1* | 6/2019 | Kim ...................... H04W 74/00 |
| 2019/0239135 A1 | 8/2019 | Levitsky et al. |
| 2019/0246420 A1 | 8/2019 | Park et al. |
| 2019/0356379 A1 | 11/2019 | Takeda et al. |
| 2020/0028560 A1 | 1/2020 | Gao et al. |
| 2020/0059398 A1 | 2/2020 | Pan et al. |
| 2020/0059867 A1 | 2/2020 | Haghighat et al. |
| 2020/0067581 A1 | 2/2020 | Osawa et al. |
| 2020/0228180 A1* | 7/2020 | Zhang ................... H04W 72/23 |

\* cited by examiner

1000

Antenna panel circuity model for mmWave band RX analogy beamforming

METHODS TO SIGNAL ANTENNA PANEL CAPABILITY OF USER EQUIPMENT (UE) FOR CARRIER AGGREGATION (CA) IN MILLIMETER-WAVE (MMWAVE) FREQUENCY BANDS

PRIORITY CLAIM

This application is a continuation of U.S. patent application Ser. No. 16/276,824, filed Feb. 15, 2019, which claims priority under 35 USC 119(e) to U.S. Provisional Patent Application Ser. No. 62/710,320, filed Feb. 16, 2018, which are incorporated herein by reference in their entirety.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to communication with multiple antenna panels. Some embodiments relate to carrier aggregation (CA).

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
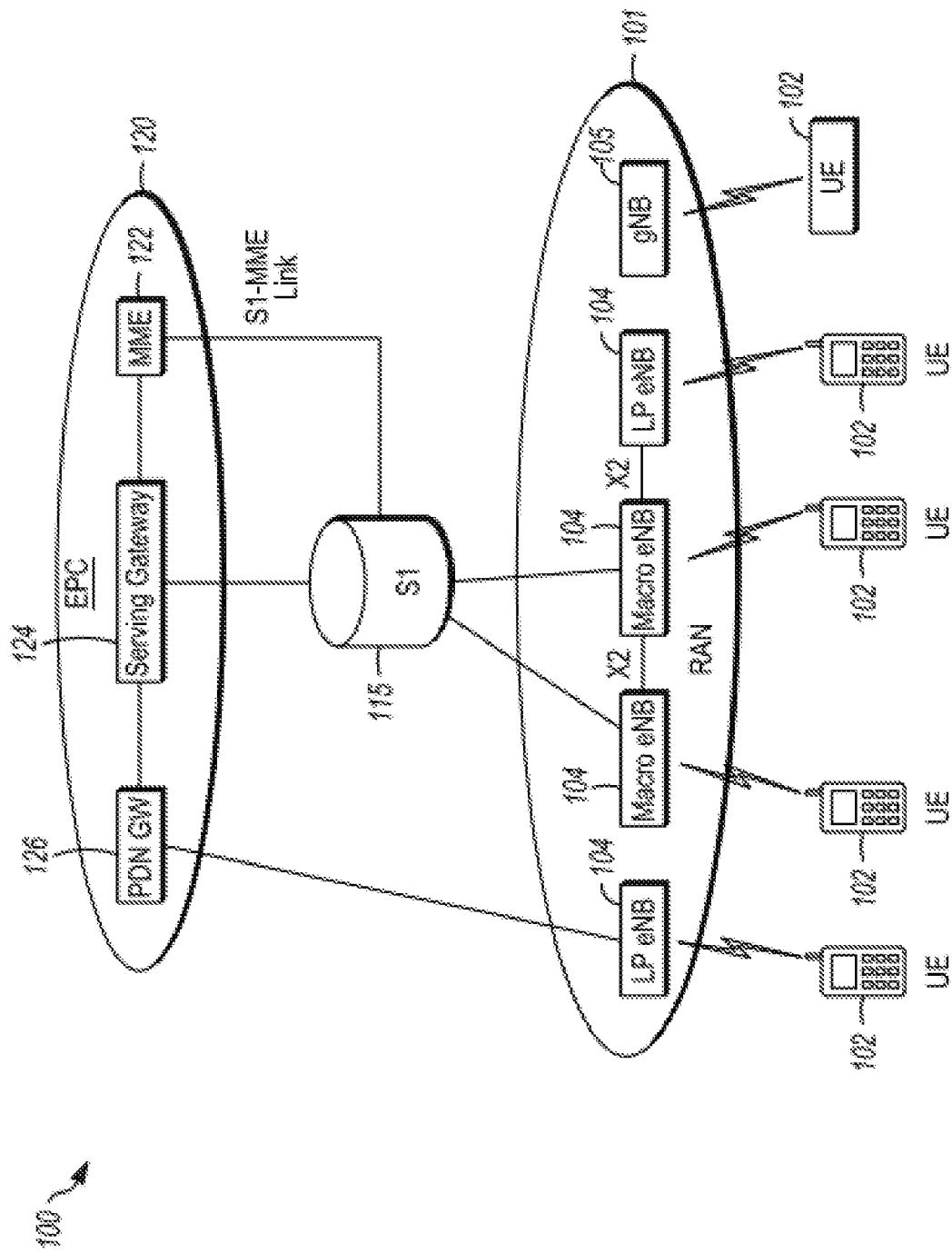
FIG. 1A is a functional diagram of an example network in accordance with some embodiments.
Figure 1B:
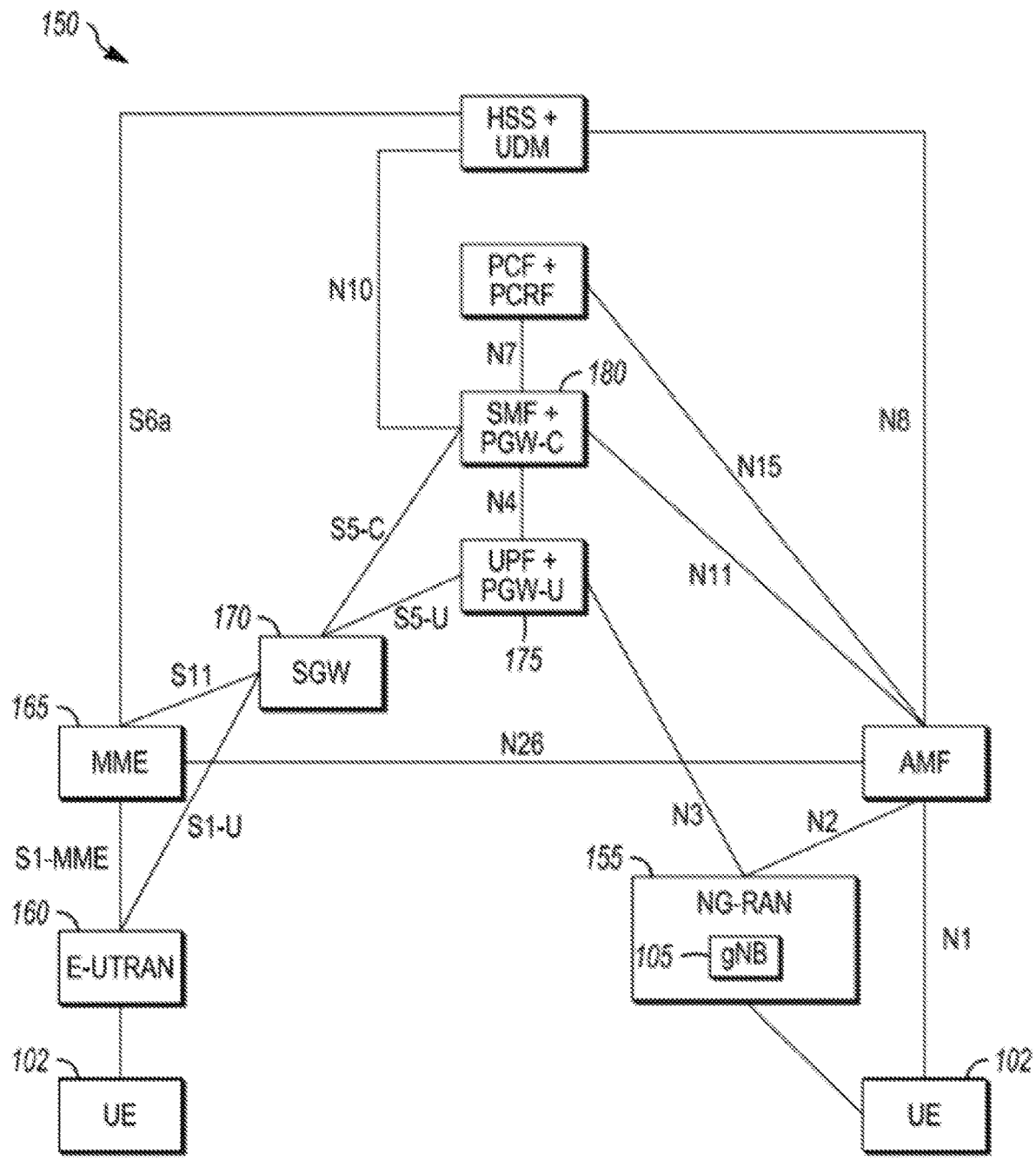
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface.

Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
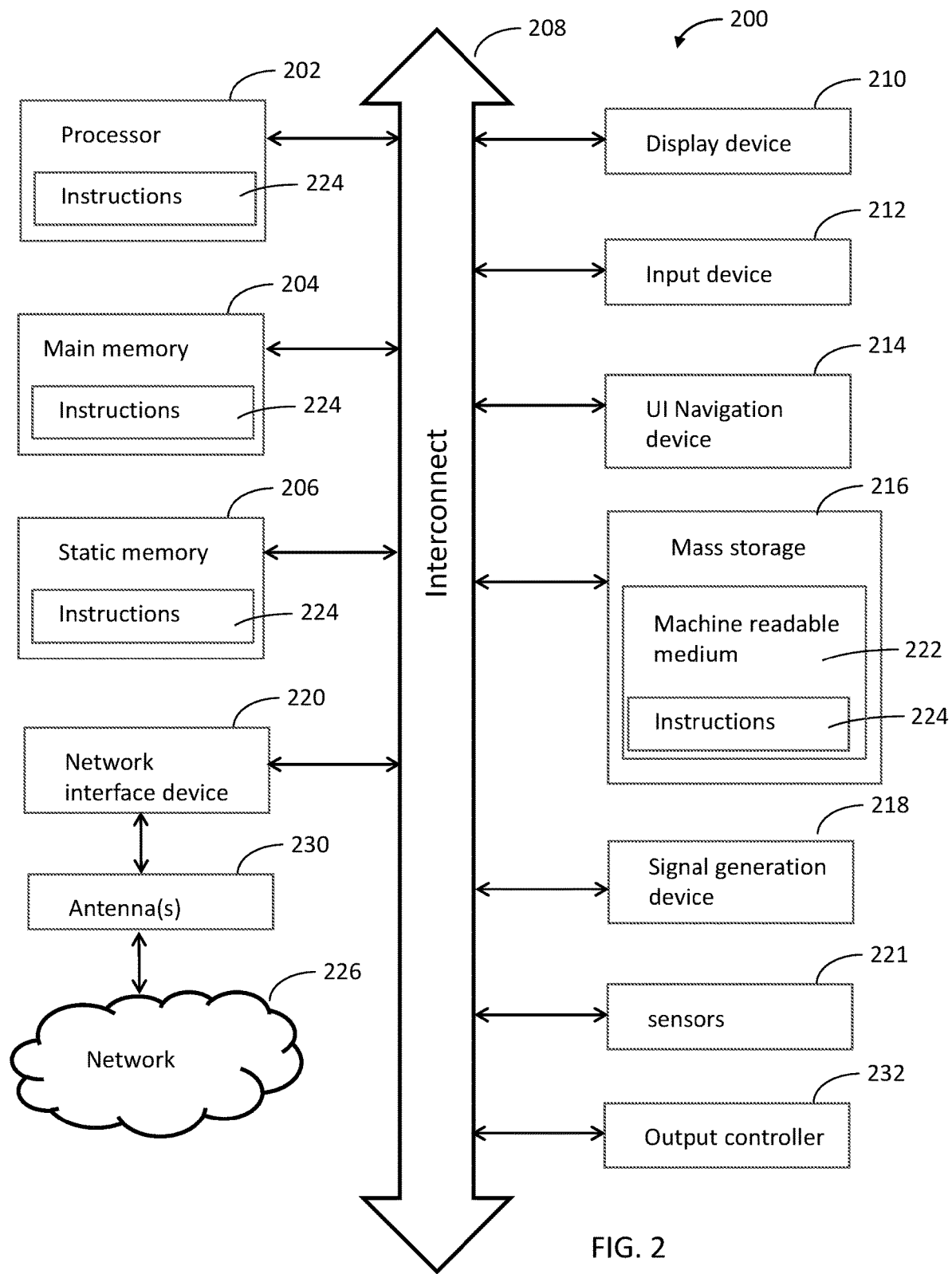
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
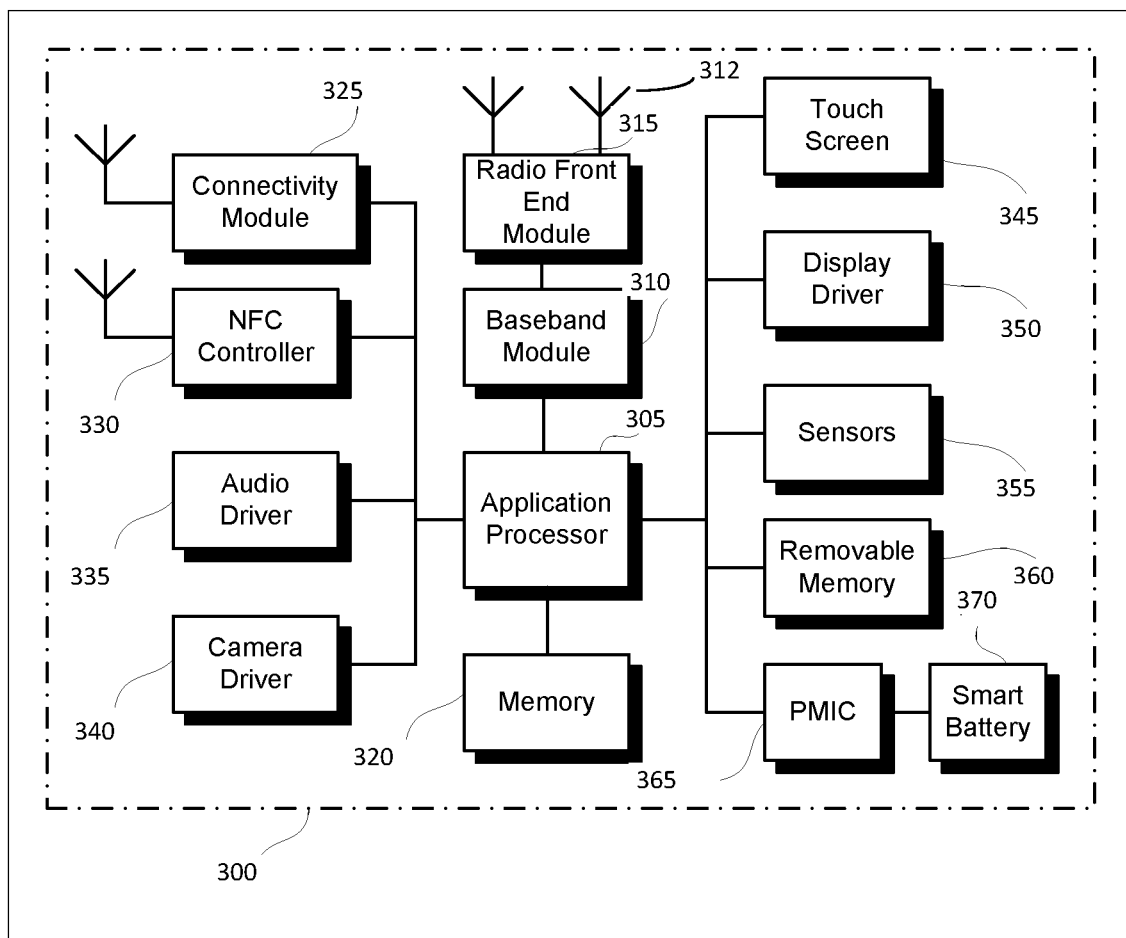
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
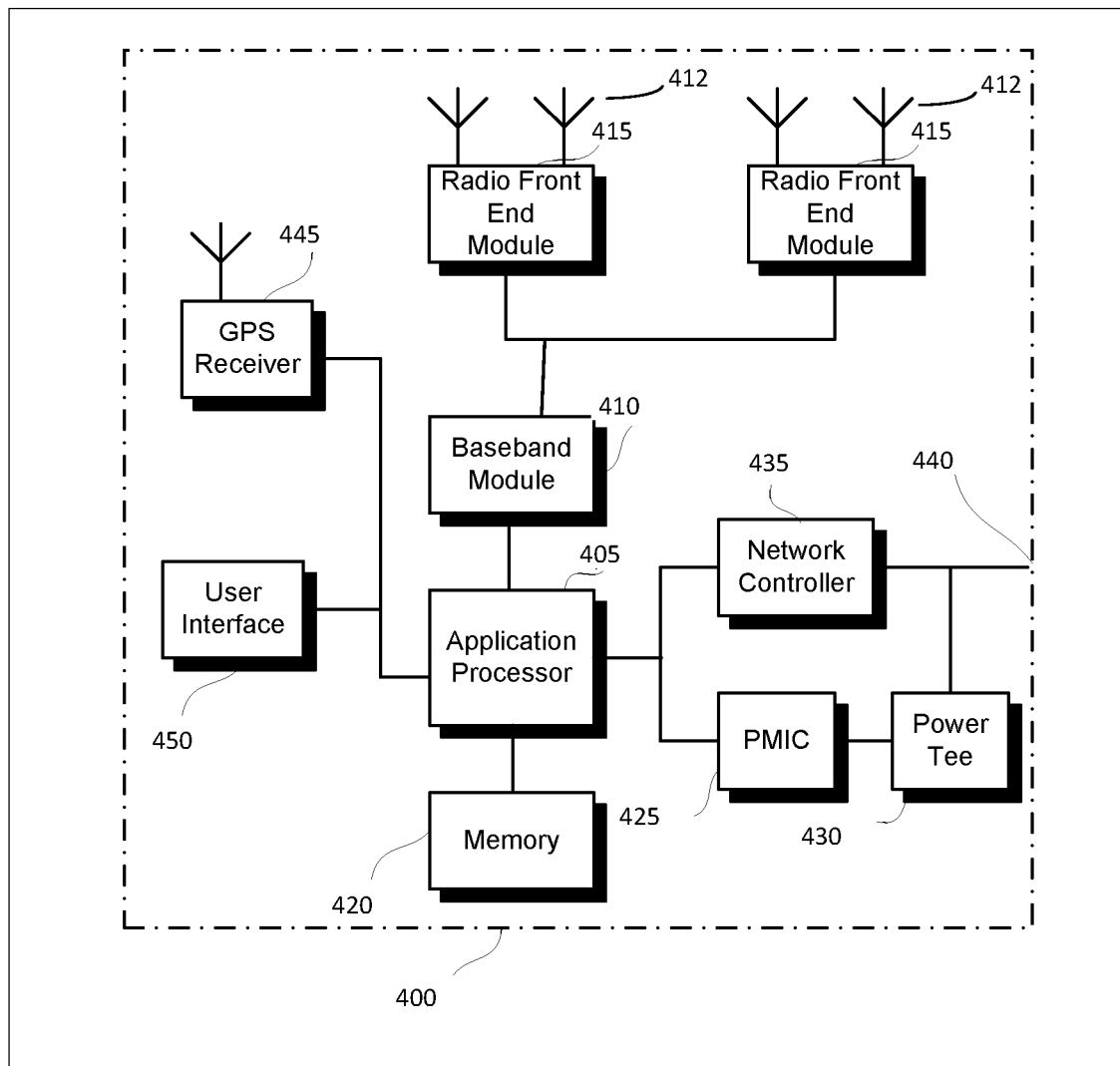
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, $I^2C$ or universal programmable serial interface module, real time clock (RTC), timer-counters including interval and watchdog timers, general purpose IO, memory card controllers such as SD/MMC or similar, USB interfaces, MPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
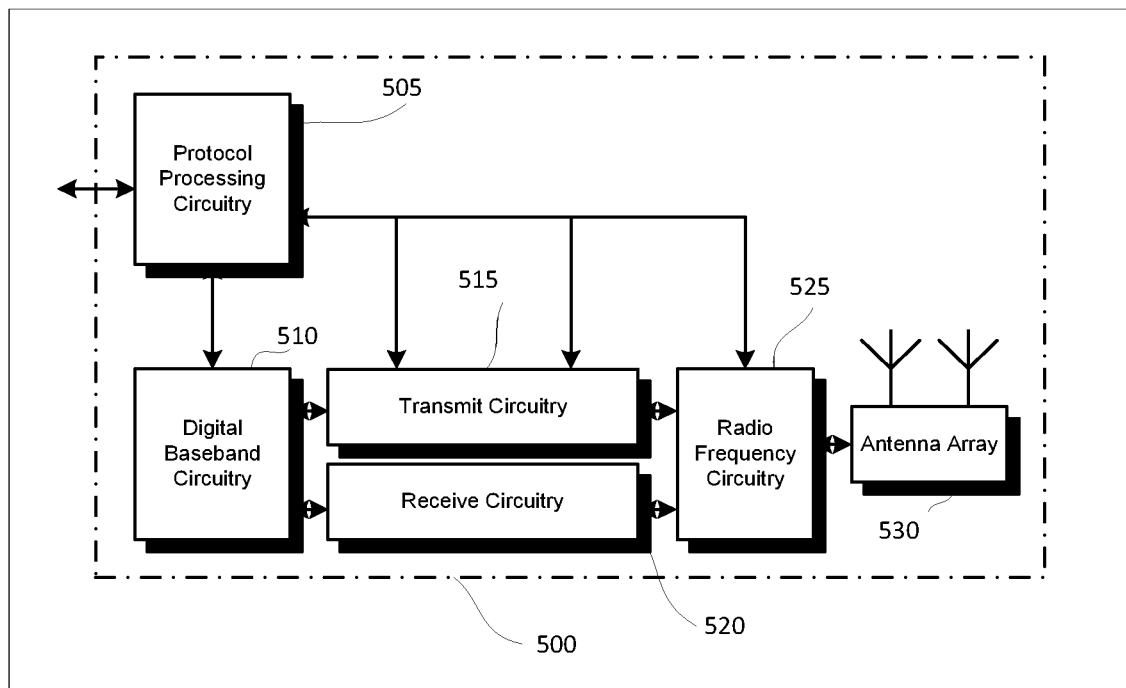
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
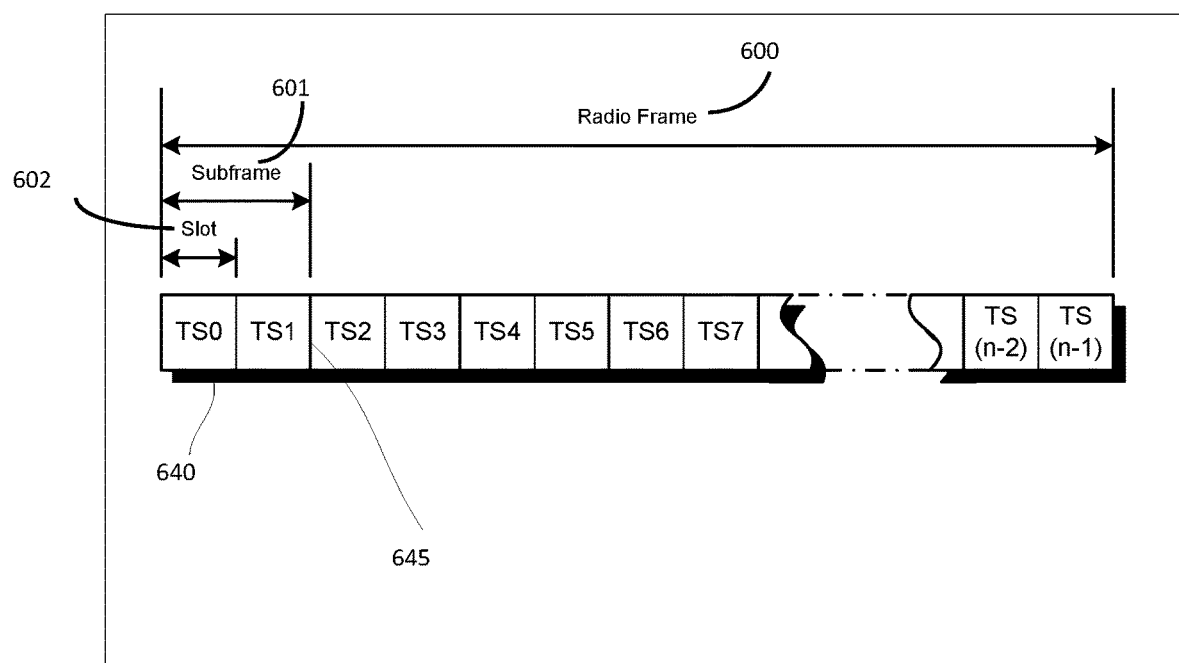
FIG. 6 illustrates an example of a radio frame structure in accordance with some embodiments.
Figures 7A, 7B:
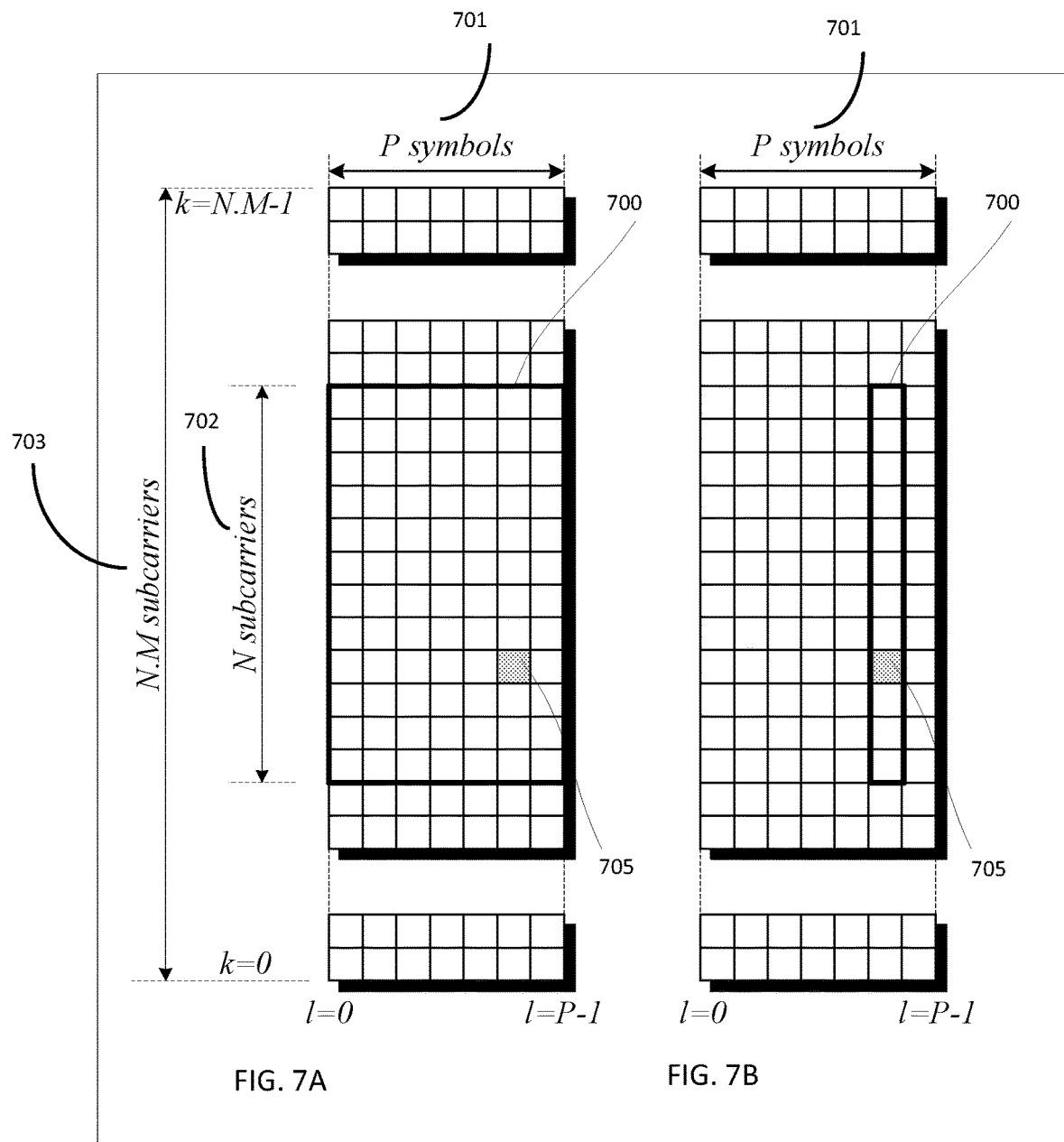
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a sub-component of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N·M−1 (as indicated by 703), where N is the number of subcarriers in a resource block, and M is the number of resource blocks spanning a component carrier in the frequency domain.

In accordance with some embodiments, the UE 102 may be configured for carrier aggregation (CA) in which a plurality of component carriers (CCs) are aggregated. The UE 102 may determine a mapping of the CCs to a plurality of antenna panels for downlink reception, wherein a subset of the CCs are mapped to each antenna panel. The UE may encode a UE CA capability information element (IE) that includes carrier aggregation related capability information of the UE 102. The UE CA capability IE may be encoded to include information related to the mapping. The UE 102 may transmit, to a Next Generation Node-B (gNB), radio resource control (RRC) signaling that includes the UE CA capability IE. The UE 102 may receive, from the gNB 105, control signaling that indicates one or more scheduled training periods for determination, by the UE 102, of one or more receive beams for the downlink reception. The UE 102 may, for each antenna panel, determine a receive beam for the downlink reception based at least partly on training signals received from the gNB 105 on at least one of the CCs mapped to the antenna panel, the signals received during one or more of the scheduled training periods. These embodiments are described in more detail below.

Figure 8:
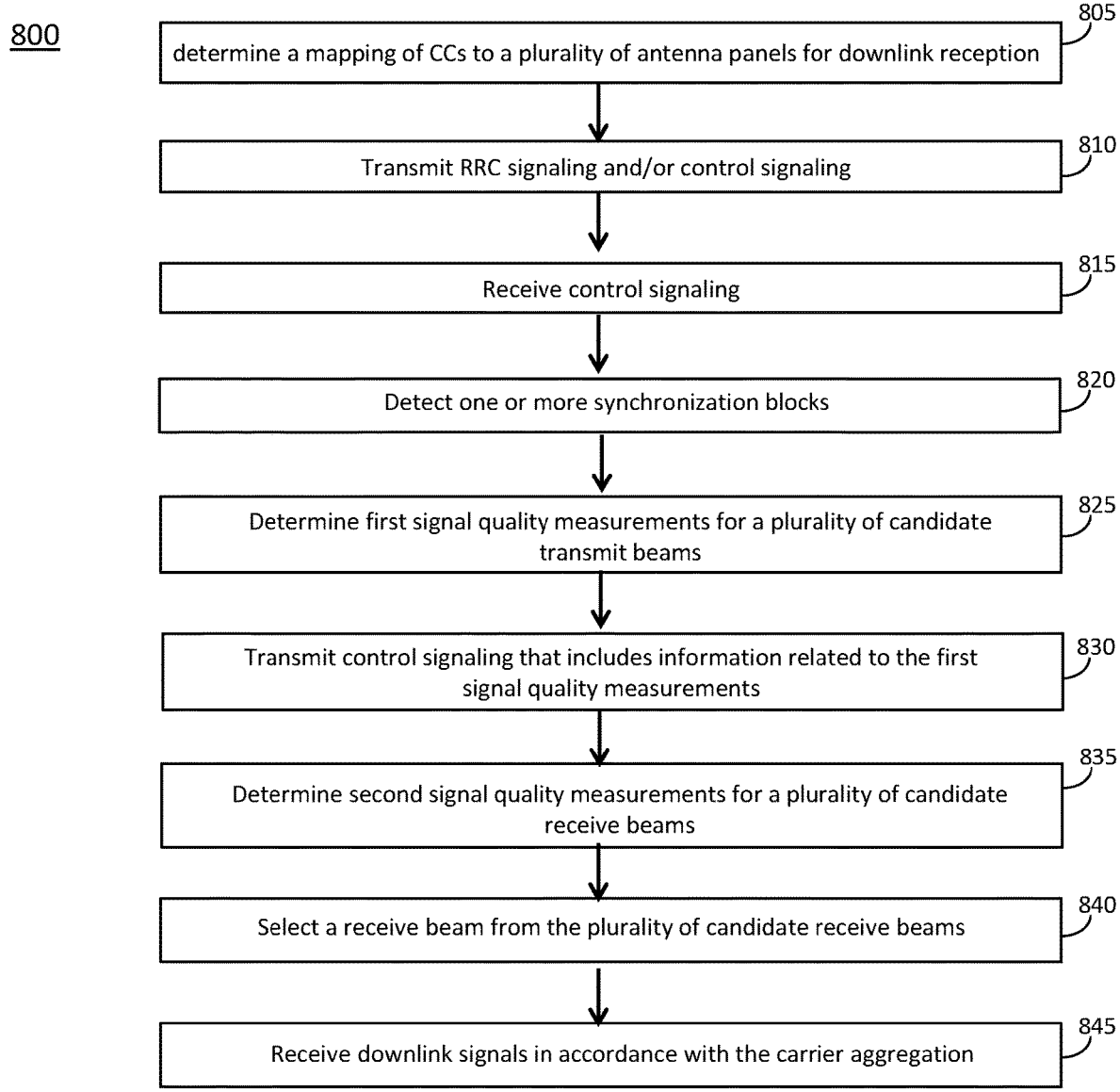
FIG. 8 illustrates the operation of a method of communication in accordance with some embodiments.
Figure 9:
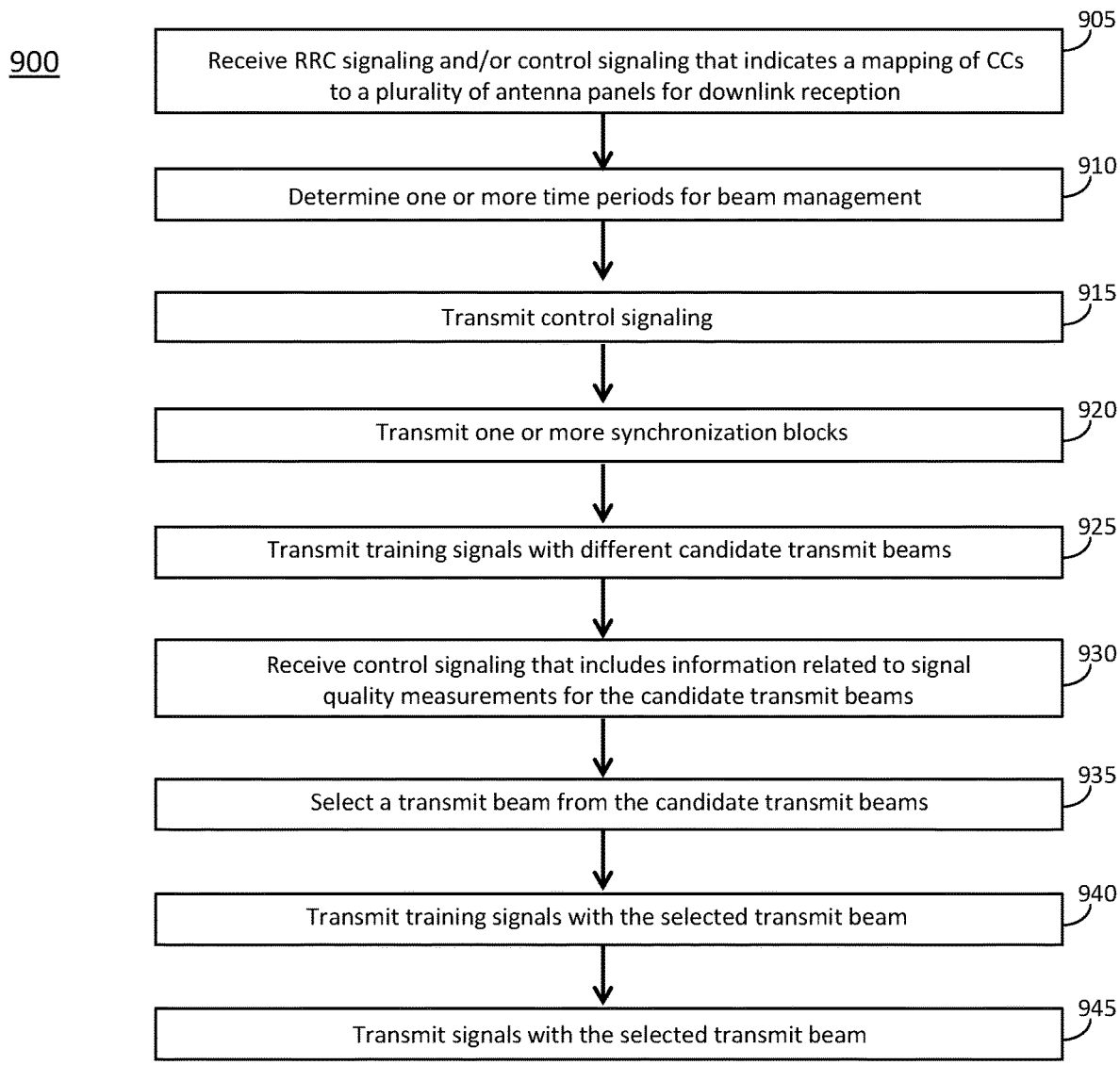
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, a UE 102 may perform one or more operations of the method 800, but embodiments are not limited to performance of the method 800 and/or operations of it by the UE 102. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the gNB 105 may perform an operation that may be the same as, similar to, reciprocal to and/or related to an operation of the method 800, in some embodiments.

In some embodiments, a gNB 105 may perform one or more operations of the method 900, but embodiments are not limited to performance of the method 900 and/or operations of it by the gNB 105. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the UE 102 may perform an operation that may be the same as, similar to, reciprocal to and/or related to an operation of the method 900, in some embodiments.

It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include reception of an element (such as a frame, block, message and/or other) by the UE 102, and an operation of the method 900 may include transmission of a same element (and/or similar element) by the gNB 105. In some cases, descriptions of operations and techniques described as part of one of the methods 800, 900 may be relevant to the other method.

Discussion of various techniques and concepts regarding one of the methods 800, 900 and/or other method may be applicable to one of the other methods, although the scope of embodiments is not limited in this respect. Such technique and concepts may include antenna panels, carrier aggregation (CA), component carriers (CCs), signaling, RRC signaling, beam management, receive beams, transmit beams, intra-panel carrier groups and/or other.

The methods 800, 900 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of elements that are included in standards, however.

At operation 805, the UE 102 may determine a mapping of a plurality of component carriers (CCs) to a plurality of antenna panels for downlink reception. In some embodiments, the UE 102 may be configured for carrier aggregation (CA) in which a plurality of CCs are aggregated. In some embodiments, a subset of the CCs may be mapped to each antenna panel.

In some embodiments, the UE 102 and/or apparatus of the UE 102 may include a transceiver coupled to the antenna panels. In some embodiments, the UE 102 may comprise the antenna panels.

In a non-limiting example, the UE 102 may determine the mapping based at least partly on a maximum frequency separation criterion, wherein carrier frequencies of any two CCs mapped to one of the antenna panels are not separated by more than the maximum frequency separation. Accordingly, the UE 102 may attempt to group CCs that are relatively close to each other in frequency (such as within the maximum frequency separation) into a same group, and the CCs of the group may be mapped/assigned to one of the antenna panels.

In some embodiments, at least one of the CCs may be in a millimeter wave (mmWave) frequency band. In some embodiments, all of the CCs may be in mmWave frequency bands. In some embodiments, one or more CCs may be in mmWave frequency band(s) and one or more CCs may be in frequency bands that are not at mmWave frequencies.

At operation 810, the UE 102 may transmit RRC signaling and/or control signaling. In some embodiments, the UE 102 may transmit the RRC signaling and/or control signaling to the gNB 105, although the scope of embodiments is not limited in this respect.

In some embodiments, the RRC signaling and/or control signaling may include information related to the mapping. In some embodiments, the UE 102 may include the information related to the mapping to assist/enable scheduling of training periods by the gNB 105, although the scope of embodiments is not limited in this respect.

Non-limiting examples are described below and elsewhere herein. The scope of embodiments is not limited to these examples in terms of name, type, size and/or other aspect(s). In some embodiments, the RRC signaling and/or control signaling may include the information related to the mapping, but may not necessarily include any of the elements described in the examples. In some embodiments, one or more of the elements described in the examples may include additional information and/or alternate information.

In some embodiments, the UE 102 may encode a UE CA capability IE. In a non-limiting example, the UE CA capability IE may be a CA-Parameters New Radio (CA-ParametersNR) IE. In some embodiments, the UE CA capability IE may include carrier aggregation related capability information of the UE. In some embodiments, the UE CA capability IE may be encoded to include information related to the mapping. In some embodiments, the UE 102 may encode the RRC signaling to include the UE CA capability IE. Embodiments are not limited to usage of the UE CA capability IE, as other elements (such as another IE, the CA-ParametersNR IE, RRC signaling, control signal and/or other) may be used.

In some embodiments, the UE 102 may encode the UE CA capability IE, RRC signaling and/or control signaling to include an indicator of support of more than one antenna panel (and/or other parameter) if the UE 102 supports downlink reception on multiple antenna panels across multiple CCs. The UE 102 may encode the UE CA capability IE, RRC signaling and/or control signaling to not include the indicator of support of more than one antenna panel if the UE 102 is restricted to downlink reception on one antenna panel across the multiple CCs. In a non-limiting example, the indicator of support of more than one antenna panel may be a "supportMoreThanOneAntennaPanel" indicator/parameter, although the scope of embodiments is not limited to this parameter or to the name of this parameter.

In some embodiments, the UE 102 may encode the UE CA capability IE, RRC signaling and/or control signaling to include a parameter that indicates a number of receive beams that can be configured for multiple CCs. In a non-limiting example, the parameter that indicates the number of receive beams may be a "numOfSimultaneousUEbeams" parameter, although the scope of embodiments is not limited to this parameter or to the name of this parameter.

In some embodiments, the UE 102 may encode the UE CA capability IE, RRC signaling and/or control signaling to indicate a number of antenna panels supported by the UE.

In some embodiments, the UE 102 may encode the UE CA capability IE, RRC signaling and/or control signaling to indicate one or more combinations of CCs mapped to one of the antenna panels.

At operation 815, the UE 102 may receive control signaling. In some embodiments, the control signaling may be received from the gNB 105, although the scope of embodiments is not limited in this respect. In some embodiments, the control signaling may indicate one or more scheduled training periods. The scheduled training periods may be for operations such as: determination, by the UE 102, of one or more transmit beams to be used, by the gNB 105, for downlink transmission; determination, by the UE 102, of one or more receive beams for the downlink reception; operations of a beam management (BM) process, including but not limited to different phases of training (including but not limited to the first phase described herein, the second phase described herein, the third phase described herein, P1, P2, P3 phases described herein, similar phases, alternate phases, other phases, other operations and/or other processes); and/or other. In some embodiments, the control signaling may include additional information and/or alternate information.

One or more operations described herein may be performed as part of a BM process. Such operations may include, but are not limited to, one or more of operations 820-840. It is understood, however, that one or more of those operations may be performed but may not necessarily be part of a BM process, in some embodiments.

At operation 820, the UE 102 may detect one or more synchronization blocks. At operation 825, the UE 102 may determine first signal quality measurements for a plurality of candidate transmit beams. At operation 830, the UE 102 may transmit control signaling that includes information related to the first signal quality measurements. At operation 835, the UE 102 may determine second signal quality measurements for a plurality of candidate receive beams. At operation 840, the UE 102 may select a receive beam from the plurality of candidate receive beams.

It is understood that one or more of operations 820-840 may be performed multiple times (such as for multiple intra-panel carrier groups, for multiple CCs, for multiple antenna panels and/or other). For instance, the UE 102 may perform one or more of operations 820-840 for a first antenna panel and may perform one of more of operations 820-840 for a second antenna panel.

In some embodiments, the UE 102 may, for each antenna panel, determine a receive beam for the downlink reception based at least partly on training signals received from the gNB 105 on at least one of the CCs mapped to the antenna panel, the signals received during one or more of the scheduled training periods.

In some embodiments, the UE 102 may determine one of more receive beams as part of a beam management (BM) process, wherein determination of each receive beam includes: a first phase for coarse acquisition, by the UE 102, of the receive beam and of a corresponding transmit beam of the gNB 105; a second phase for refinement of the transmit beam of the gNB 105; and a third phase for refinement of the receive beam. It should be noted that in descriptions herein, one or more operations may be performed as part of a phase, but the scope of embodiments is not limited in this respect. One or more of those operations may be performed, and may not necessarily be included in a phase.

It should be noted that the terms "first phase," "second phase," and "third phase" may be used herein for clarity, but such references are not limiting. Embodiments are not limited to any chronological order related to usage of the terms "first phase," "second phase," and "third phase." Some embodiments may not necessarily include all three of those phases. Some embodiments may include one or more additional phases, related phases, alternate phases and/or other phases.

In some embodiments, the first phase may be referred to as a "P1 phase," although the scope of embodiments is not limited in this respect. In some embodiments, the second phase may be referred to as a "P2 phase," although the scope of embodiments is not limited in this respect. In some embodiments, the third phase may be referred to as a "P3 phase," although the scope of embodiments is not limited in this respect.

In some embodiments, the UE 102 may, as part of the first phase: detect one or more synchronization signal blocks. The UE 102 may, as part of the second phase: determine first signal quality measurements on training signals received by the UE 102 from different candidate transmit beams of the gNB 105; encode, for transmission to the gNB 105, feedback related to the first signal quality measurements; and/or other operation(s). The UE 102 may, as part of the third phase: determine second signal quality measurements on training signals received by the UE 102 by different candidate receive beams; select the receive beam from the candidate receive beams based at least partly on the second signal quality measurements; and/or other operation(s).

In some embodiments, the UE 102 may perform one or more of: map the CCs into intra-panel groups per antenna panel for downlink reception; transmit RRC signaling and/or control signaling that includes information related to mapping of the CCs into the intra-panel groups; receive, from the gNB 105, control signaling that indicates scheduled training periods for a beam management (BM) process; and/or other. In some embodiments, the BM process may include, for each antenna panel, one or more of: a first phase for coarse acquisition, by the UE 102, of the receive beam and of a corresponding transmit beam of the gNB 105; a second phase for refinement of the transmit beam of the gNB 105; a third phase for refinement of the receive beam; and/or other. In some embodiments, the UE 102 may include the information related to the mapping in the RRC signaling and/or control signaling to enable determination, by the gNB 105, of the scheduled training periods.

It should be noted that embodiments are not limited by the names "first phase," "second phase," and "third phase" and are not limited to usage of those phases. For instance, the UE 102 may perform the coarse acquisition, and the coarse acquisition may not necessarily be part of the first phase or part of any phase, in some embodiments.

In addition, the UE 102 may perform one or more of the operations described above, but may not necessarily perform all operations (such as operations of one or more phases), in some embodiments.

In some cases, conflicts may occur, such as conflicts between training periods on different CCs and/or other. Various techniques may be used to resolve such conflicts.

In some embodiments, for each antenna panel, if a first CC and a second CC are mapped to the antenna panel, and if a first training period for the first CC overlaps a second training period for the second CC, the UE 102 may determine the receive beam for the antenna panel based on training signals received on the CC, from the first and second CCs, of highest bandwidth. In a non-limiting example, if training periods of two CCs overlap, the UE 102 may prioritize the CC of higher bandwidth, and may perform operations (such as determination of signal quality measurements) for the prioritized CC. In another non-limiting example, if training periods of two CCs overlap, the UE 102 may prioritize the CC for which a bandwidth of an activated bandwidth part (BWP) within the CC is highest, and may perform operations (such as determination of signal quality measurements) for the prioritized CC.

In some embodiments, for each antenna panel, if a first CC and a second CC are mapped to the antenna panel, and if a first training period for the first CC overlaps a second training period for the second CC, the UE 102 may determine the receive beam for the antenna panel based on training signals received on the CC, from the first and second CCs, for which a cell type is of higher priority. The cell type may be either primary cell (PCell) or secondary cell (Scell), and the Pcell is of highest priority than the SCell. For instance, if training periods of two CCs overlap, the UE 102 may prioritize a CC of the PCell over a CC of the SCell, and may perform operations (such as determination of signal quality measurements) for the prioritized CC At operation 845, the UE 102 may receive downlink signals in accordance with the carrier aggregation. In some embodiments, the UE 102 may receive the downlink signals from the gNB 105, although the scope of embodiments is not limited in this respect. In some embodiments, the UE 102 may receive the downlink signals in accordance with the receive beam(s) determined at operation 840.

In some embodiments, an apparatus of a UE 102 may comprise memory. The memory may be configurable to store information related to the mapping of the CCs to the plurality of antenna panels. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding of the UE CA capability IE. The apparatus may include a transceiver to transmit RRC signaling. The transceiver may transmit and/or receive other blocks, messages and/or other elements.

At operation 905, the gNB 105 may receive RRC signaling and/or control signaling that indicates a mapping of CCs to a plurality of antenna panels for downlink reception at the UE 102. In some embodiments, the RRC signaling and/or control signaling may indicate information related to a mapping between antenna panels of the UE 102 and CCs of a carrier aggregation (CA). In some embodiments, the RRC signaling may include a UE CA capability IE (including but not limited to a CA-ParametersNR IE) that indicates the mapping, although the scope of embodiments is not limited in this respect. In some embodiments, the gNB 105 may receive the RRC signaling and/or control signaling from the UE 102, although the scope of embodiments is not limited in this respect.

At operation 910, the gNB 105 may determine one or more time periods for beam management. In some embodiments, the gNB 105 may determine the one or more time periods based at least partly on the mapping indicated in the RRC signaling and/or control signaling received at operation 905. In some embodiments, the gNB 105 may determine, based at least partly on the mapping, for each CC: a first scheduled time period for transmit beam refinement, wherein the gNB 105 is to transmit first training signals in accordance with a plurality of candidate transmit beams; a second scheduled time period for receive beam refinement at the UE 102, wherein the gNB 105 is to transmit second training signals in accordance with one of the transmit beams of the candidate transmit beams; and/or other.

At operation 915, the gNB 105 may transmit control signaling. The control signaling may indicate information related to the scheduled time periods and/or other information.

At operation 920, the gNB 105 may transmit one or more synchronization blocks.

At operation 925, the gNB 105 may transmit training signals with different candidate transmit beams. At operation 930, the gNB 105 may receive control signaling that includes information related to signal quality measurements for the candidate transmit beams. At operation 935, the gNB 105 may select a transmit beam from the candidate transmit beams. In some embodiments, one or more of operations 925-935 may be performed multiple times. For instance, one or more of operations 925-935 may be performed for: each CC, each antenna panel, each intra-panel carrier group, one or more CCs, one or more antenna panels, one or more intra-panel carrier groups and/or other.

In some embodiments, the gNB 105 may receive feedback from the UE 102 that indicates, for one or more of the CCs, information related to signal quality measurements for candidate transmit beams. The UE 102 may determine transmit beams to be used, for each CC, for transmission of training signals for receive beam refinement at the UE 102.

At operation 940, the gNB 105 may transmit training signals with the selected transmit beam. For instance, training signals may be transmitted on a CC on the corresponding transmit beam for the CC, and the UE 102 may receive the training signals by different candidate receive beams as part of refinement of the receive beam.

In some embodiments, the gNB 105 may, for each CC, transmit one or more synchronization signal blocks for coarse acquisition of a transmit beam and a receive beam as part of a first phase. The first scheduled time period for transmit beam refinement may be part of a second phase. The second scheduled time period for receive beam refinement may be part of a third phase. Embodiments are not limited to these phases, as other phases (P1, P2, P3 and/or other) may be used. In addition, embodiments are not limited to performance of operations described herein as part of a phase.

At operation 945, the gNB 105 may transmit signals with the selected transmit beam(s). For instance, after transmit beams are determined/selected, the gNB 105 may transmit signals (such as signals based on data, control and/or other) in accordance with those transmit beams.

In some embodiments, an apparatus of a gNB 105 may comprise memory. The memory may be configurable to store information identifying the mapping of the CCs to the plurality of antenna panels. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to decoding of RRC signaling. The apparatus may include a transceiver to receive the RRC signaling. The transceiver may transmit and/or receive other blocks, messages and/or other element.

Figure 10:
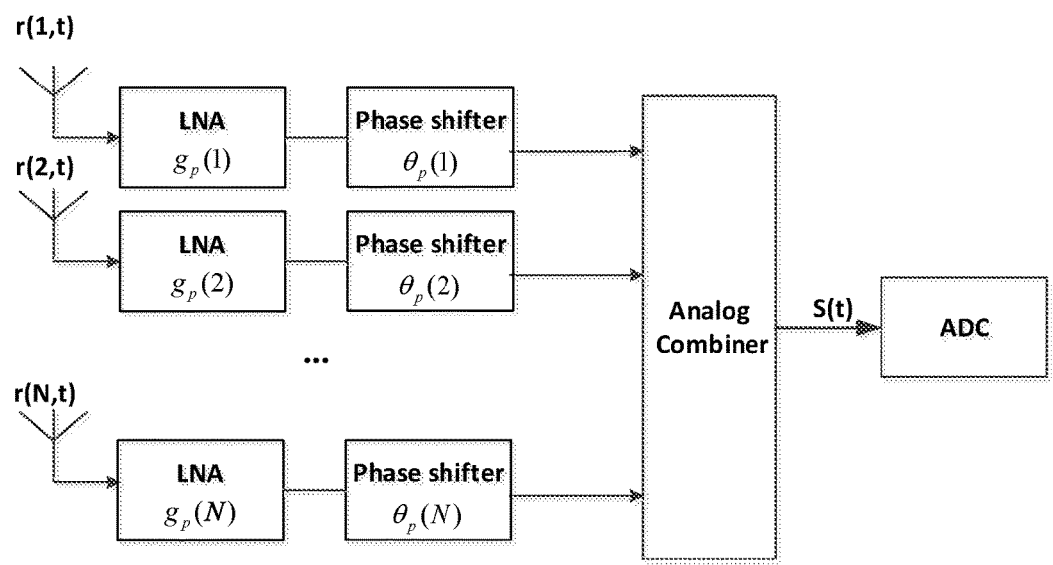
FIG. 10 illustrates an example arrangement for beamforming in accordance with some embodiments.
Figure 11:
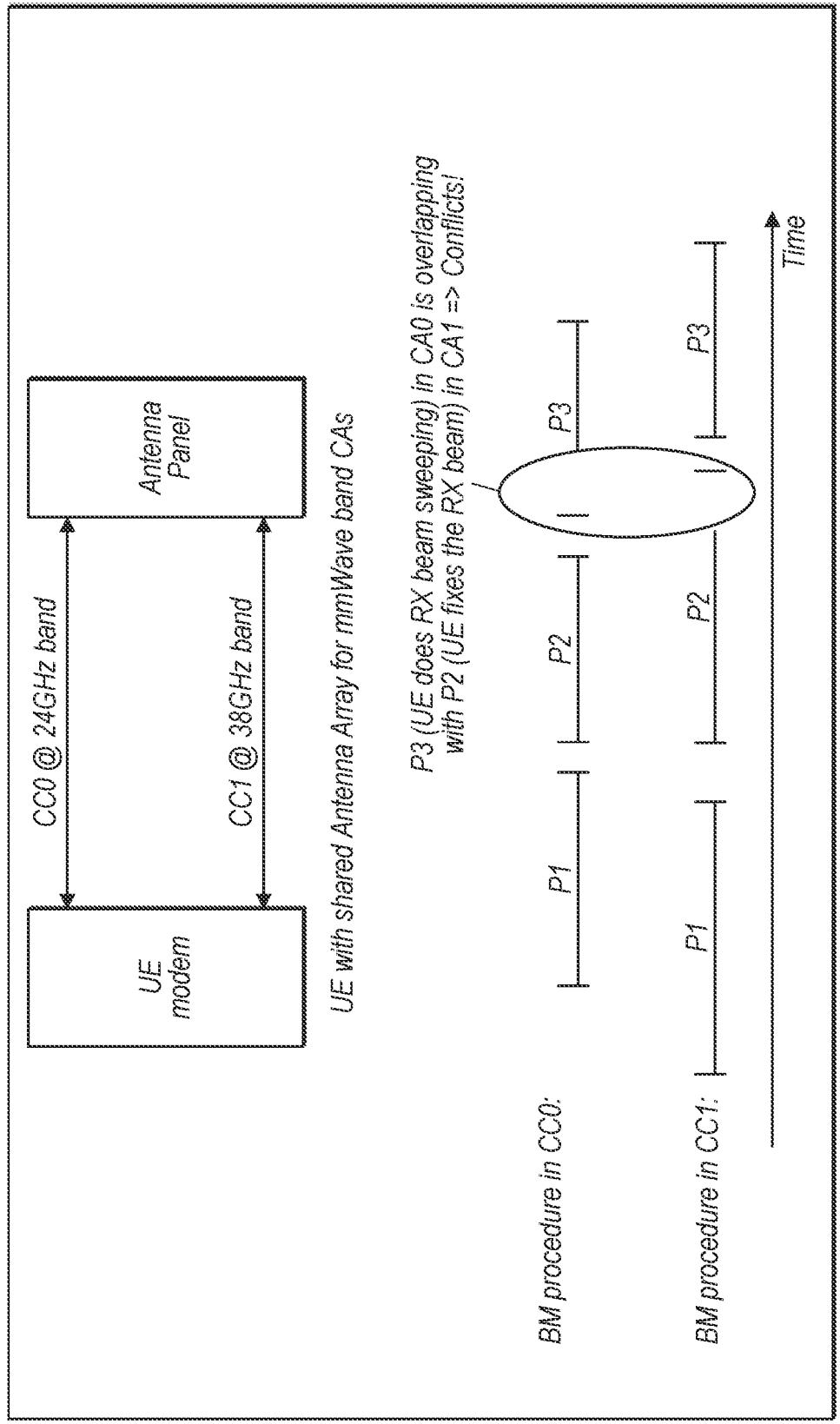
FIG. 11 illustrates an example scheduling conflict in accordance with some embodiments.
Figure 12:
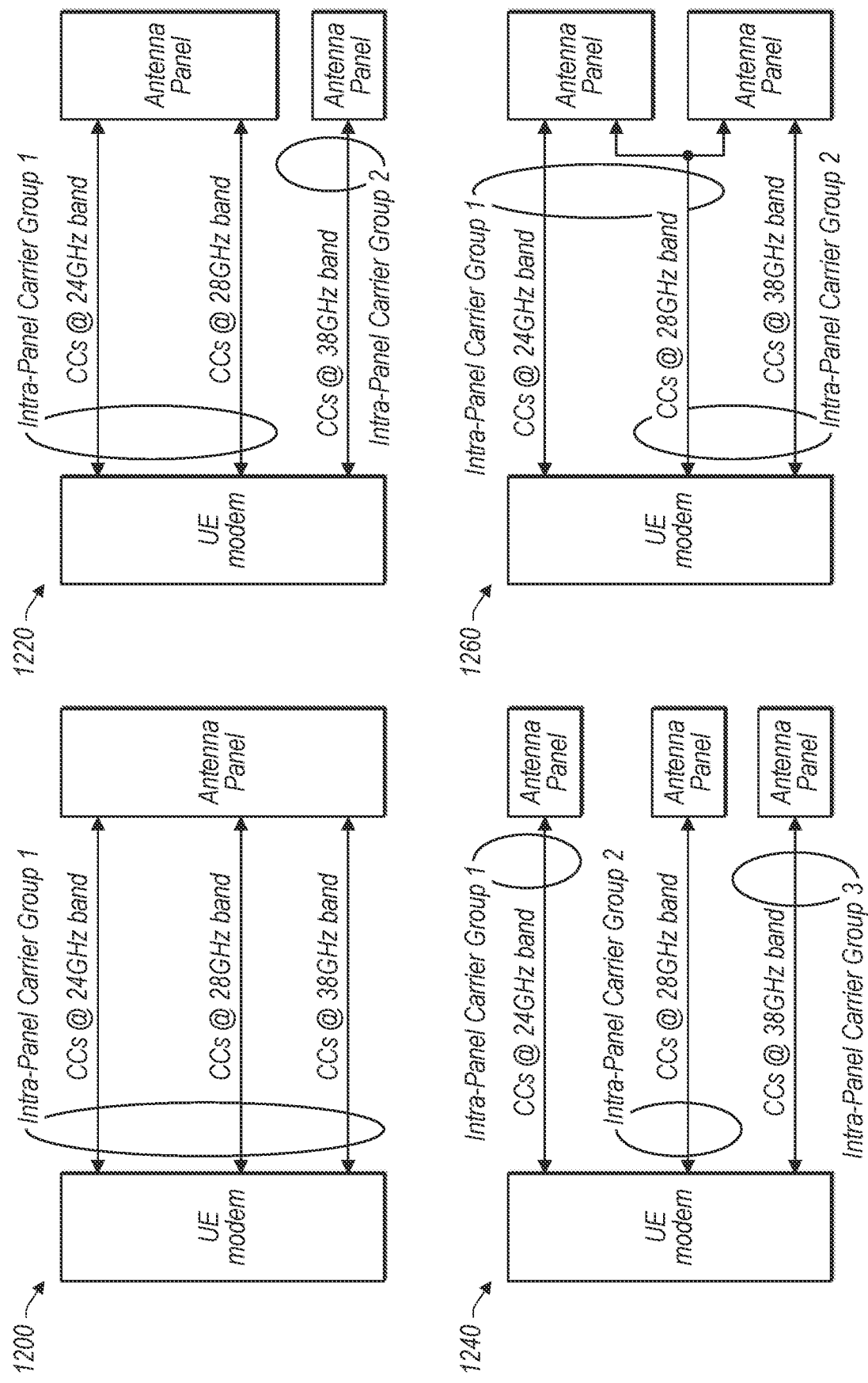
FIG. 12 shows non-limiting examples of intra-panel Carrier Groups in accordance with some embodiments.
Figure 13:
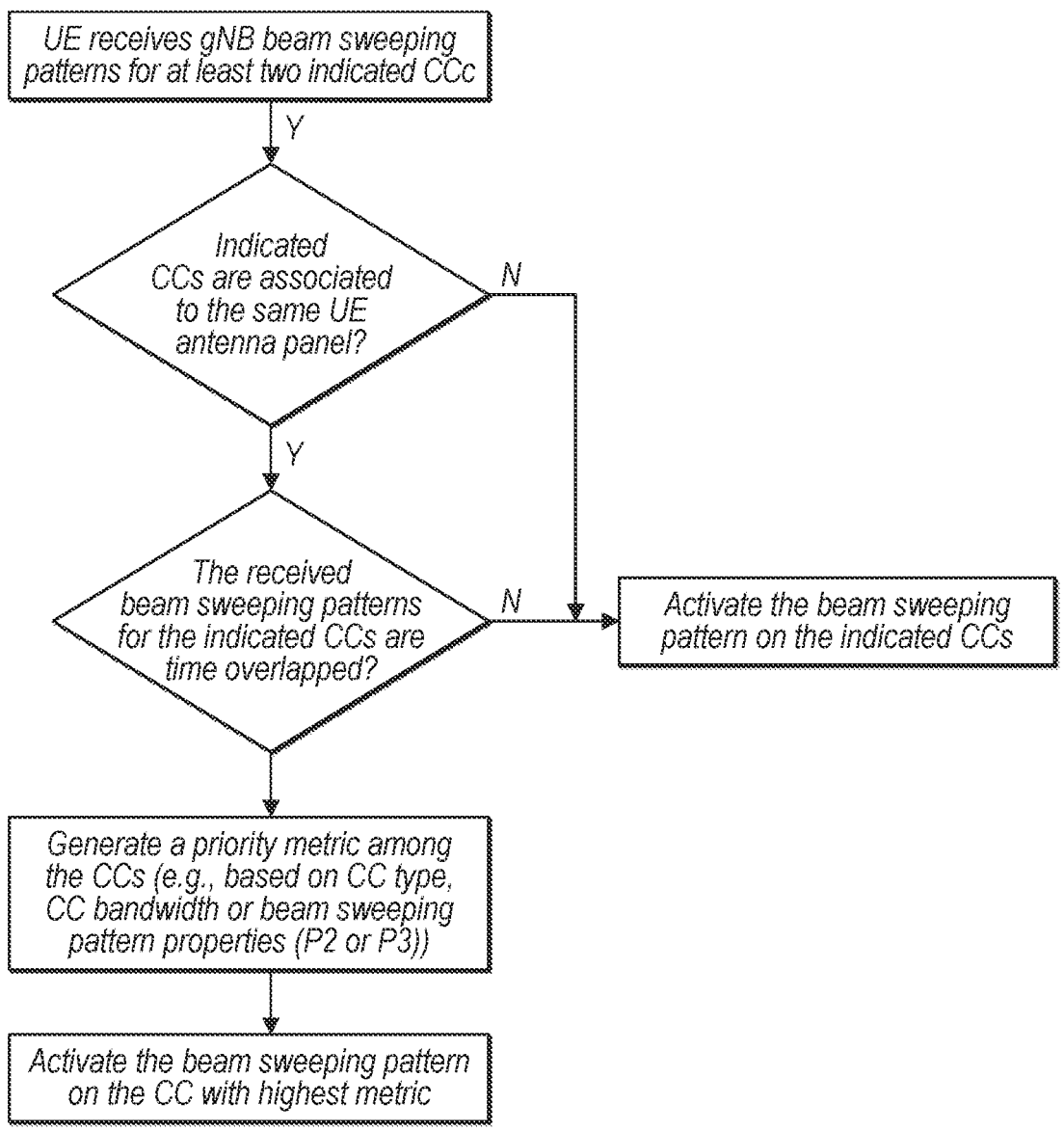
FIG. 13 illustrates an example procedure in accordance with some embodiments.

FIG. 10 illustrates an example arrangement for beamforming in accordance with some embodiments. FIG. 11 illustrates an example scheduling conflict in accordance with some embodiments. FIG. 12 shows non-limiting examples of intra-panel Carrier Groups in accordance with some embodiments. FIG. 13 illustrates an example procedure in accordance with some embodiments. It should be noted that the examples shown in FIGS. 10-13 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-13. Although some of the elements shown in the examples of FIGS. 10-13 may be included in a 3GPP LTE standard, 5G standard, NR standard and/or other standard, embodiments are not limited to usage of such elements that are included in standards.

UE RX Analog beam forming is one major feature introduced by 5G NR mmWave band (FR2) communications. Analogy beamforming is achieved by antenna array circuities within UE 102 (also named as antenna panels) as shown in FIG. 10. The non-limiting example 1000 illustrates an antenna array model for RX analog beamforming. In the system model of FIG. 10, N is the number of antenna elements within one antenna array. r(k,t), k=1, 2, . . . , N is the received analog signal on each antenna element within the antenna array at time t. A vector of phase configurations $\theta_p(k)$, k=1, 2, . . . , N and LNA gain configurations $g_p(k)$, k=1, 2, . . . , N, $g_p(k)>0$ for the antenna elements within the antenna array is called one analog code-word (a phase vector+a gain vector). For each code-word p, the analogy beam-formed RX signal at UE receiver side is then represented as the following form.

$$s(t) = \sum_{k=1}^{N} r(k, t) \cdot g_p(k) \cdot e^{j\theta_p(k)}$$

The UE 102 may pre-optimize a set of analogy codewords (called an analogy code-book), e.g. by lab calibrations and or lab testing, and store the pre-optimized code-book in its memory. Each code-word is associated to one UE RX beam. Different code-words can be associated to different UE RX beams pointing to different spatial directions, but can also be associated to RX beams pointing to the same spatial direction but with different beam widths. During online operation, through 5G NR beam management procedures, UE need to identify the best code-word from its pre-stored code-book for DL reception.

In FIG. 10, a non-limiting example of TX Analog beam forming may be realized by replacing LNA by PA, replacing Analog combiner by Power splitter, replacing ADC by DAC, and reversing the directions of the arrows.

Analog beamforming has been introduced for 3GPP 5G NR operation in mmWave bands. On the UE 102 side, analog beamforming may be achieved by making use of the different phase shifting of antenna elements within an antenna array (also named as antenna panel). An antenna panel is able to generate two beams in two polarizations (H beam and V beam) which can provide antenna diversity in case of MIMO transmission.

In current 3GPP 5G NR standard in release 15, Beam Management (BM) framework has been defined to support beam management procedures between gNB and UE in order to find the best TX-RX beam pair between the two parties. For example, for DL transmission, P1/P2/P3 procedures may be implicitly reflected by the 3GPP NR BM framework and are the working assumption for UE 102 and gNB 105 implementation. The procedures are referred to as P1, P2, and P3, but such references are not limiting. The procedures may be a first phase, second phase, and third phase, in some embodiments. In addition, embodiments are not limited to performance of operations as part of a phase.

In some embodiments, in a first phase (such as P1 and/or other), initial beam acquisition is performed, wherein the UE 102 finds the best coarse TX-RX beam (wide beams) pair using synchronization signals blocks (SSB). In some embodiments, in a second phase (such as P2 and/or other), gNB TX beam refinement is performed, wherein the UE 102 fixes its RX beam and the gNB 105 sweeps the TX beams (narrow beams) and finds the best TX beam based on measurement reports from the UE 102. In some embodiments, in a third phase (such as P3 and/or other), UE RX beam refinement is performed, wherein the gNB 105 fixes its TX beam to the best TX beam (from the second phase), and the UE 102 sweeps the RX beams (narrow beams) and finds the best RX beam based on internal measurement metrics of the UE 102.

Regarding carrier-aggregation (CA) operation in 5G NR mmWave bands (e.g. one CC (component carrier) in 24 GHz band and another CC in 38 GHz band), the current 3GPP BM framework supports the signaling of BM procedures (e.g. first/second/third phases; P1/P2/P3; and/or other) separately (by separated carrier index) for each aggregated carrier. This provides the gNB 105 with flexibility to schedule BM procedures independently of CCs. However, an issue is that, it is up to UE 102 implementation whether all CCs in mmWave bands share the same antenna panel or not. For low-cost UEs 102, it may be possible, in some designs, that all CCs in the mmWave bands share the same antenna panel. Such a design may sacrifice a bit of the beamforming performance because the frequency distance between CCs in different mmWave bands may be high enough such that the formed beam cannot be optimal for both CCs, in some cases.

For high performance UEs 102, it may be possible, in some embodiments, that CCs in different mmWave bands use different antenna panels. This may provide benefits, as the formed beam may be optimal, in some cases, for each CC in each band.

In some embodiments, signaling procedures may be defined by 3GPP 5G NR standard to indicate such capability from UE 102 to the gNB 105. In some cases, if this capability is not indicated to the gNB 105 by the UE 102, conflicts may occur when the gNB 105 schedules BM procedures to the UE 102 in a CA scenario. In FIG. 11, an example 1100 illustrates BM scheduling conflicts when the UE 102 shares a same antenna panel for all mmWave CCs, but the gNB 105 is not aware of this capability.

In some embodiments, a capability signaling may be sent by the UE 102 to the gNB 105 to indicate one or more of: UE capability; whether and how the mmWave bands occupies the antenna panel(s) within a UE 102; and/or other.

As one alternative, it is proposed to differentiate mmWave CA bands supported by the UE 102 by different intra-Panel Carrier Groups. The CCs within a same intra-panel carrier group may share the same antenna panel within the UE 102. By receiving such information from the UE 102, the gNB 105 can then accordingly schedule the coordinated BM procedures for each intra-panel carrier group. This may help to avoid some scheduling conflicts, in some cases. Note that the proposed signaling may also be applicable to single carrier operation scenario in mmWave bands. For example, the UE 102 may implement separate antenna panels, which may operate in parallel for the same band. Such a capability can be signaling to network using similar concepts. Accordingly, the network can schedule second phase/third phase (such as P2/P3 and/or other) procedures in parallel to the UE 102.

As another alternative, the UE 102 may indicate the capability of separated antenna panels to the network. For instance, RRC signaling may be used, in some embodiments. Other types of signaling may be used, in some embodiments.

Furthermore, for robustness against a non-user friendly gNB 105 implementation, it is proposed to introduce priority handling for concurrent BM procedures in mmWave CA scenario in case conflicts still exist (e.g. due to non-deal timing synchronicity among different intra-panel groups). The priority can be based on cell type (e.g. Pcell has higher priority than Scell) or CC specific parameters (Scells with higher bandwidth has higher priority than other Scells, etc) or by BM procedure types (e.g. CCs with P2 step has higher priority than CCs with P3 step to avoid waiting from gNB 105).

In some embodiments, optimized BM for different UE 102 antenna panel capability in mmWave CA operations may be used. In some embodiments, robust BM procedures in mmWave CA operations may be used.

To ensure that BM scheduling by the gNB 105 has minimal conflicts in case of CA operations in mmWave bands, it is proposed to introduce a new capability signaling from the UE 102 to the gNB 105 in 5G NR mmWave communications. The signaling may indicate how the UE 102 maps the mmWAVE bands into different antenna panels of the UE 102. As one implementation example, the signaling may map each of the mmWave bands supported by the UE 102 into an Intra-Panel Carrier Group (each group is associated with an index). In some embodiments, all mmWave CA bands within the indicated intra-panel Carrier Group may share a same antenna panel within the UE 102.

FIG. 12 shows non-limiting examples 1200, 1220, 1240, 1260 of how the proposed intra-panel Carrier Groups may be mapped. The examples 1200, 1220, 1240, 1260 may illustrate how the intra-panel carrier groups may be generated.

It should be noted that the example 1260 in FIG. 12 shows a case in which multiple antenna panels are supported by a single band which enables multiple panel operations. In FIG. 12, for the example 1240 (bottom left), CCs at 28 GHz band may be associated to two independent UE 102 antenna panels. By knowing this capability through indication by the UE 102, the gNB 105 could accordingly schedule parallel second phase/third phase (such as P2 and P3 and/or other) procedures on the CCs at 28 Ghz band.

As an alternative, the UE 102 may indicate the capability of separated antenna panels to the network. In some embodiments RRC signaling may be used. Other types of signaling may be used, in some embodiments. In some embodiments, the indication may be 1 bit signaling, which indicates whether the UE 102 comprises only one antenna panel or not. In some embodiments, the indication may be 1 bit signaling that indicates whether the UE 102 could support more than 1 UE RX beam simultaneously. In some embodiments, the indication may be a number of separated panels supported by the UE 102. In some embodiments, the indication may be associated with band ID and/or band combinations. In some embodiments, band combinations may be applied for CA or Dual-Connectivity (DC) cases.

Furthermore, in cases in which there is remaining BM scheduling conflicts which can still not be avoided (for instance, due to non-deal timing synchronicity among different intra-panel groups), it is proposed to introduce priority handling for concurrent BM procedures in mmWave CA operations. The priority can be based on cell type (e.g. Pcell has higher priority than Scell) or CC specific parameters (Scells with higher bandwidth has higher priority than other Scells, etc) or by BM procedure types (e.g. CCs with the second phase and/or P2 step has higher priority than CCs with third phase and/or P3 step to avoid waiting from the gNB 105).

An example procedure 1300 is shown in FIG. 13. The example procedure may be for CC priority handling when the beam management scheduling pattern in different CCs are conflicting due to an antenna panel capability of the UE 102.

In some embodiments, a UE 102 may map supported mmWave bands (supported by the UE 102) into intra-panel carrier groups. The bands within an intra-panel carrier group may share a same antenna panel hardware within the UE 102. In some embodiments, the UE 102 may indicate the mapping of intra-panel carrier groups into a base station through higher layer signaling. In some embodiments, the UE 102 may indicate, to the network, a capability of separated antenna panels. RRC signaling and/or other signaling may be used, in some embodiments. In some embodiments, the indication may be 1 bit signaling. Embodiments are not limited to usage of 1 bit, however, as any suitable number of bits may be used in some embodiments.

In some embodiments, the indication may be related to a number of separated panels supported by the UE 102. In some embodiments, the indication may be associated with band ID or band combinations. In some embodiments, band combinations may be applied for CA or DC cases.

In some embodiments, the gNB 105 (and/or base station (BS)) may determines the dependency of beam management procedures on different aggregated carriers to the UE 102 based on the indicated intra-panel carrier groups information. In some embodiments, the UE 102 may resolve conflicts of beam management procedures from different aggregated carriers by comparing the priority of beam management procedures. In some embodiments, the priority can be based on the type of an aggregated carrier. In a non-limiting example, a primary cell may have a higher priority than a secondary cell. In some embodiments, the priority can be based on the bandwidth of an aggregated carrier. In a non-limiting example, the aggregated carrier with higher bandwidth may have higher priority. In some embodiments, the priority can be based on the steps of beam management procedure on an aggregated carrier. In a non-limiting example, the second phase and/or P2 procedure may have a higher priority than the third phase and/or P3 procedure. In some embodiments, the priority may be jointly determined by usage of two or more techniques described herein (including but not limited to the techniques described above).

In some embodiments, the gNB 105 (and/or the base station) may generate beam management scheduling patterns for more than 1 component carriers, based on the received UE 102 antenna panel capability. In some embodiments, the beam management scheduling patterns for gNB TX beam refinement (second phase and/or P2) in a first component carrier and the UE RX beam refinement (third phase and/or P3) on a second component carrier can be triggered at a same time instance when the two component carriers are associated to different UE antenna panels. In some embodiments, the beam management scheduling patterns for gNB TX beam refinement (second phase and/or P2) in a first component carrier and the UE RX beam refinement (third phase and/or P3) on a second component carrier can be triggered in different time instances when the two component carriers are associated to a same UE antenna panel.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   a memory; and
   processing circuitry to configure a user equipment (UE) for carrier aggregation (CA) in which a plurality of component carriers (CCs) are aggregated, the processing circuitry configured to:
      determine a capability for beam management (BM) of the UE, wherein the capability indicates the UE's capability to perform coordinated BM procedures within a band combination;
      encode a UE CA capability information element (IE) that includes carrier aggregation related capability information of the UE, wherein the UE CA capability IE is encoded to include the capability for BM, wherein the capability for BM is indicated per band combination;
      encode, for transmission to a base station (BS), radio resource control (RRC) signaling that includes the UE CA capability IE;
      decode, from the BS, one or more signals for measurement by the UE; and
      perform beam management at the UE based at least partly on the signals received from the BS on at least one CC of the plurality of CCs within a band combination according to the capability for BM, wherein the memory is configured to store information related to the capability.

2. The apparatus according to claim 1, wherein performing the beam management includes determining, based on the one or more signals for measurement, a receive beam for use at the UE.

3. The apparatus according to claim 1, wherein the capability for BM of the UE is based on a mapping of antenna panels to groups of CCs, and wherein said determining includes determining a respective beam for the antenna panel based of the groups of CCs.

4. The apparatus according to claim 1, wherein the UE's capability to perform coordinated BM procedures within a band combination includes one of:
   coordinated BM of a plurality of CCs within a band combination, or
   independent BM of respective CCs.

5. The apparatus according to claim 1, wherein the capability for BM includes an indicator of support of more than one antenna panel if the UE supports downlink reception on multiple antenna panels across multiple CCs.

6. The apparatus according to claim 1, the processing circuitry further configured to:
   encode the UE CA capability IE to indicate a number of antenna panels supported by the UE.

7. The apparatus according to claim 1, wherein the band combination includes two or more millimeter wave (mm Wave) frequency bands.

8. The apparatus according to claim 1, the processing circuitry further configured to:
   encode the UE CA capability IE to include a parameter that indicates a number of simultaneous receive beams that can be configured for multiple CCs.

9. The apparatus according to claim 1, wherein the UE carrier aggregation related capability IE is a CA-Parameters New Radio (CA-ParametersNR) IE.

10. The apparatus according to claim 1, the processing circuitry further configured to:
    decode, from the BS, control signaling that indicates one or more training periods for the periods for performing the beam management.

11. A non-transitory computer-readable memory medium storing software instructions that, when executed by processing circuitry of a User Equipment (UE) cause the processing circuitry to:
    determine a capability for beam management (BM) of the UE, wherein the capability indicates the UE's capability to perform coordinated BM procedures within a band combination;
    encode a UE carrier aggregation (CA) capability information element (IE) that includes carrier aggregation related capability information of the UE, wherein the UE CA capability IE is encoded to include the capability for BM, wherein the capability for BM is indicated per band combination;
    encode, for transmission to a base station (BS), radio resource control (RRC) signaling that includes the UE CA capability IE;
    decode, from the BS, one or more signals for measurement by the UE; and
    perform beam management at the UE based at least partly on the signals received from the BS on at least one component carrier (CC) of a plurality of CCs within a band combination according to the capability for BM.

12. The non-transitory computer-readable memory medium according to claim 11, wherein the capability for BM of the UE is based on a mapping of antenna panels to groups of CCs, and wherein said determining includes determining a respective beam for the antenna panel based of the groups of CCs.

13. The non-transitory computer-readable memory medium according to claim 11, wherein the UE's capability to perform coordinated BM procedures within a band combination includes one of:
    coordinated BM of a plurality of CCs within a band combination, or
    independent BM of respective CCs.

14. The non-transitory computer-readable memory medium according to claim 11, wherein the software instructions further cause the processing circuitry to:
    encode the UE CA capability IE to indicate a number of antenna panels supported by the UE.

15. The non-transitory computer-readable memory medium according to claim 11, wherein the software instructions further cause the processing circuitry to:
    encode the UE CA capability IE to include a parameter that indicates a number of simultaneous receive beams that can be configured for multiple CCs.

16. An apparatus comprising:
    a memory; and
    processing circuitry to configure a base station (BS) for carrier aggregation (CA) in which a plurality of component carriers (CCs) are aggregated, the processing circuitry configured to cause the BS to:
       receive, from a user equipment (UE), radio resource control (RRC) signaling that includes a UE CA capability information element (IE) that includes carrier aggregation related capability information of the UE, wherein the UE CA capability IE includes a capability for beam management (BM) of the UE, wherein the capability for BM indicates the UE's capability to perform coordinated BM procedures within a band combination, wherein the capability for BM is indicated per band combination;

transmit, to the UE, one or more signals for measurement by the UE; and determine if scheduling conflicts exists for the UE on a band combination based at least partly on the UE's capability to perform coordinated BM procedures within the band combination, wherein the memory is configured to store information related to the capability.

17. The apparatus according to claim 16, wherein the UE's capability to perform coordinated BM procedures within the band combination is based on a mapping of antenna panels to groups of CCs.

18. The apparatus according to claim 16, wherein the UE's capability to perform coordinated BM procedures within a band combination includes one of coordinated BM of a plurality of CCs within a band combination, or independent BM of respective CCs.

19. The apparatus according to claim 16, wherein the carrier aggregation related capability information of the UE includes an indicator of support of more than one antenna panel if the UE supports downlink reception on multiple antenna panels across multiple CCs.

20. The apparatus according to claim 16, wherein the band combination includes two or more millimeter wave (mmWave) frequency bands.

* * * * *